(12) United States Patent
Archer et al.

(10) Patent No.: US 7,734,706 B2
(45) Date of Patent: Jun. 8, 2010

(54) LINE-PLANE BROADCASTING IN A DATA COMMUNICATIONS NETWORK OF A PARALLEL COMPUTER

(75) Inventors: Charles J. Archer, Rochester, MN (US); Jeremy E. Berg, Rochester, MN (US); Michael A. Blocksome, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/843,090

(22) Filed: Aug. 22, 2007

(65) Prior Publication Data

US 2009/0055474 A1    Feb. 26, 2009

(51) Int. Cl.
    *G06F 15/16*    (2006.01)
(52) U.S. Cl. ............... 709/206; 709/201; 709/205; 709/207; 709/238
(58) Field of Classification Search ............... 709/204, 709/206, 207, 201, 205, 238
    See application file for complete search history.

(56) References Cited

U.S. PATENT DOCUMENTS

| | | | |
|---|---|---|---|
| 4,715,032 A | 12/1987 | Nilsson | |
| 5,105,424 A * | 4/1992 | Flaig et al. ............... | 709/243 |
| 5,333,279 A * | 7/1994 | Dunning ............... | 710/100 |
| 5,513,371 A * | 4/1996 | Cypher et al. ............... | 712/29 |
| 5,541,914 A * | 7/1996 | Krishnamoorthy et al. .. | 370/427 |
| 5,617,538 A | 4/1997 | Heller | |
| 5,721,828 A | 2/1998 | Frisch | |
| 5,822,604 A | 10/1998 | Ogasawara et al. | |
| 5,832,215 A | 11/1998 | Kato et al. | |
| 5,864,712 A | 1/1999 | Carmichael et al. | |
| 5,892,923 A * | 4/1999 | Yasuda et al. ............... | 709/239 |
| 5,937,202 A * | 8/1999 | Crosetto ............... | 712/19 |
| 5,949,988 A * | 9/1999 | Feisullin et al. ............... | 703/2 |
| 5,958,017 A | 9/1999 | Scott et al. | |
| 6,067,609 A * | 5/2000 | Meeker et al. ............... | 712/11 |
| 6,076,131 A * | 6/2000 | Nugent ............... | 710/310 |
| 6,212,617 B1 | 4/2001 | Hardwick | |

(Continued)

OTHER PUBLICATIONS

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

(Continued)

*Primary Examiner*—Michael Won
(74) *Attorney, Agent, or Firm*—Biggers & Ohanian, LLP

(57) ABSTRACT

Methods, apparatus, and products are disclosed for line-plane broadcasting in a data communications network of a parallel computer, the parallel computer comprising a plurality of compute nodes connected together through the network, the network optimized for point to point data communications and characterized by at least a first dimension, a second dimension, and a third dimension, that include: initiating, by a broadcasting compute node, a broadcast operation, including sending a message to all of the compute nodes along an axis of the first dimension for the network; sending, by each compute node along the axis of the first dimension, the message to all of the compute nodes along an axis of the second dimension for the network; and sending, by each compute node along the axis of the second dimension, the message to all of the compute nodes along an axis of the third dimension for the network.

9 Claims, 9 Drawing Sheets

U.S. PATENT DOCUMENTS

| | | | | |
|---|---|---|---|---|
| 6,272,548 | B1* | 8/2001 | Cotter et al. | 709/239 |
| 6,289,424 | B1* | 9/2001 | Stevens | 711/170 |
| 6,292,822 | B1 | 9/2001 | Hardwick | |
| 6,334,138 | B1 | 12/2001 | Kureya | |
| 6,480,885 | B1* | 11/2002 | Olivier | 709/207 |
| 6,754,211 | B1 | 6/2004 | Brown | |
| 6,914,606 | B2 | 7/2005 | Amemiya et al. | |
| 7,284,033 | B2* | 10/2007 | Jhanji | 709/206 |
| 2002/0016901 | A1 | 2/2002 | Carvey et al. | |
| 2002/0144027 | A1 | 10/2002 | Schmisseur | |
| 2004/0073590 | A1 | 4/2004 | Bhanot et al. | |
| 2005/0094577 | A1 | 5/2005 | Ashwood-Smith | |

OTHER PUBLICATIONS

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Office Action Dated Mar. 4, 2008 in U.S. Appl. No. 11/279,620.

Office Action Dated Sep. 3, 2008 in U.S. Appl. No. 11/279,620.

Office Action Dated Dec. 29, 2008 in U.S. Appl. No. 11/279,620.

Office Action Dated Apr. 3, 2009 in U.S. Appl. No. 11/769,367.

Office Action Dated Dec. 13, 2007 in U.S. Appl. No. 11/459,387.

Office Action Dated Jul. 11, 2008 in U.S. Appl. No. 11/459,387.

Office Action Dated Mar. 18, 2009 in U.S. Appl. No. 11/459,387.

Office Action Dated Feb. 9, 2009 in U.S. Appl. No. 11/737,286.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

* cited by examiner

US 7,734,706 B2

LINE-PLANE BROADCASTING IN A DATA COMMUNICATIONS NETWORK OF A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

CROSS-REFERENCE TO RELATED APPLICATION

This application is related to U.S. patent application Ser. No. 11/843,083, filed on Aug. 22, 2007.

BACKGROUND OF THE INVENTION

1. Field of the Invention

The field of the invention is data processing, or, more specifically, methods, apparatus, and products for line-plane broadcasting in a data communications network of a parallel computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory needed for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A tree network lends itself to certain collective operations, but is typically inefficient for point to point operations. A torus network, however, provides network links and routing capabilities that make a torus network well suited for point to point operations. One message passing operation often implemented as a point to point operation includes a broadcast operation. A broadcast operation instructs a broadcasting compute node to distribute data from the broadcasting compute node to all the other compute nodes in a group. Because thousands of nodes may participate in a broadcast operation using a point to point network of a parallel computer, broadcasting data from a broadcasting node to each of the other compute nodes in a group of nodes is always a challenge. If the group is large, and such groups may contain thousands of compute nodes, then the data communications cost of such an algorithm is substantial.

SUMMARY OF THE INVENTION

Methods, apparatus, and products are disclosed for line-plane broadcasting in a data communications network of a parallel computer, the parallel computer comprising a plurality of compute nodes connected together through the data communications network, the data communications network optimized for point to point data communications and characterized by at least a first dimension, a second dimension, and a third dimension, that include: initiating, by a broadcasting compute node, a broadcast operation, including sending a message to all of the compute nodes along an axis of the first dimension for the data communications network; sending, by each compute node along the axis of the first dimension, the message to all of the compute nodes along an axis of the second dimension for the data communications network; and sending, by each compute node along the axis of the second dimension, the message to all of the compute nodes along an axis of the third dimension for the data communications network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
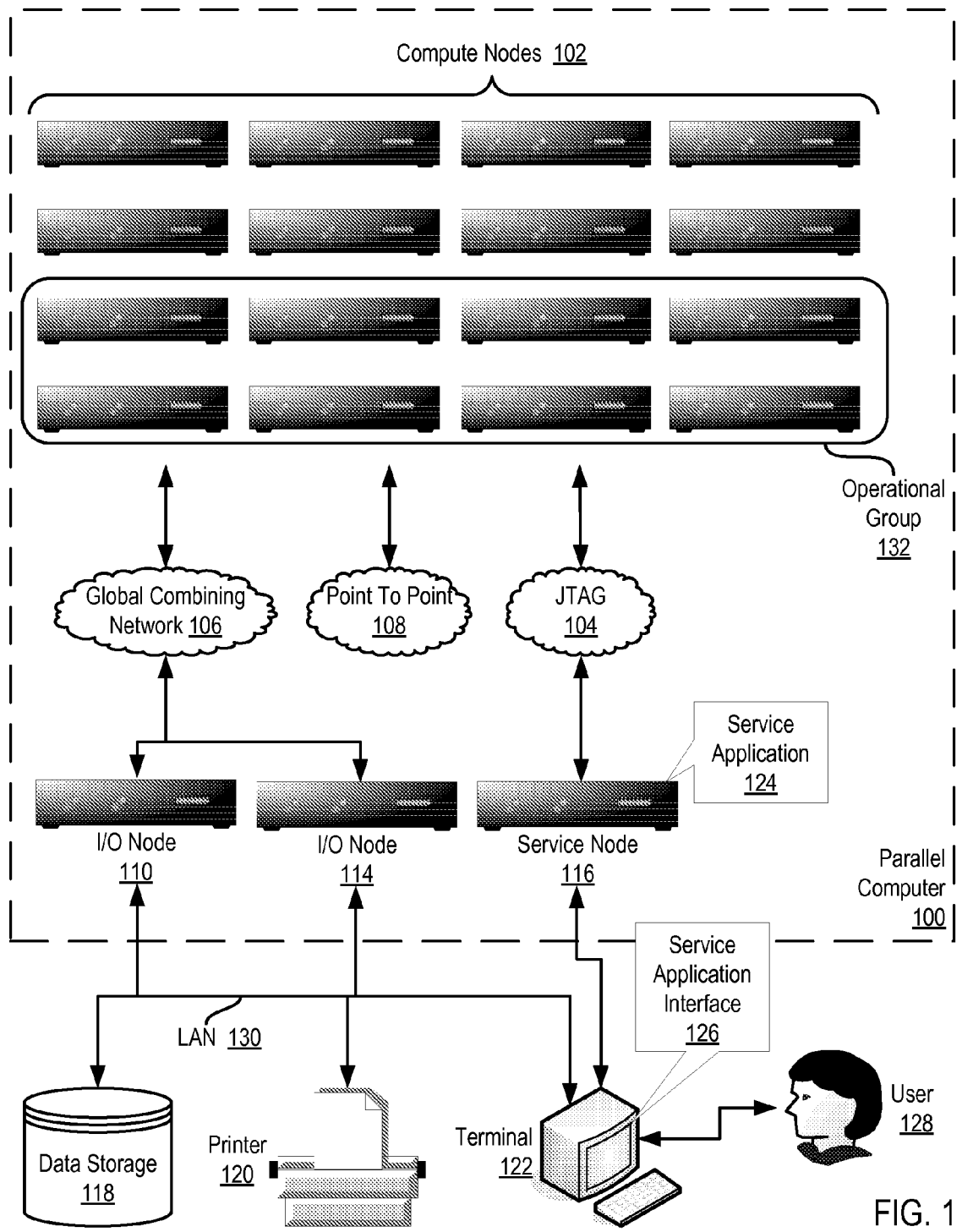
FIG. 1 illustrates an exemplary parallel computer for line-plane broadcasting in a data communications network of the parallel computer according to embodiments of the present invention.

Exemplary methods, apparatus, and computer program products for line-plane broadcasting in a data communications network of a parallel computer according to embodiments of the present invention are described with reference to the accompanying drawings, beginning with FIG. 1. FIG. 1 illustrates an exemplary parallel computer for line-plane broadcasting in a data communications network of the parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 operates generally for line-plane broadcasting in a data communications network of a parallel computer according to embodiments of the present invention. The parallel computer (100) includes a plurality of compute nodes (102) connected together through the data communications network (108) optimized for point to point data communications. The data communications network (108) is characterized by at least a first dimension, a second dimension, and a third dimension. The parallel computer (100) of FIG. 1 operates generally for line-plane broadcasting in a data communications network of a parallel computer according to embodiments of the present invention by: initiating, by a broadcasting compute node, a broadcast operation, including sending a message to all of the compute nodes along an axis of the first dimension for the data communications network (108); sending, by each compute node along the axis of the first dimension, the message to all of the compute nodes along an axis of the second dimension for the data communications network (108); and sending, by each compute node along the axis of the second dimension, the message to all of the compute nodes along an axis of the third dimension for the data communications network (108). In such a manner, a line-plane broadcast according to embodiments of the present invention broadcasts data along an axis for one of the dimensions for the network and, as the data encounters a plane formed by two other dimensions, the data propagates through each plane encountered.

The arrangement of nodes, networks, and I/O devices making up the exemplary system illustrated in FIG. 1 are for explanation only, not for limitation of the present invention. Data processing systems capable of line-plane broadcasting in a data communications network of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Line-plane broadcasting in a data communications network of a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of line-plane broadcasting in a data communications network of the parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application (158) executes point to point and collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
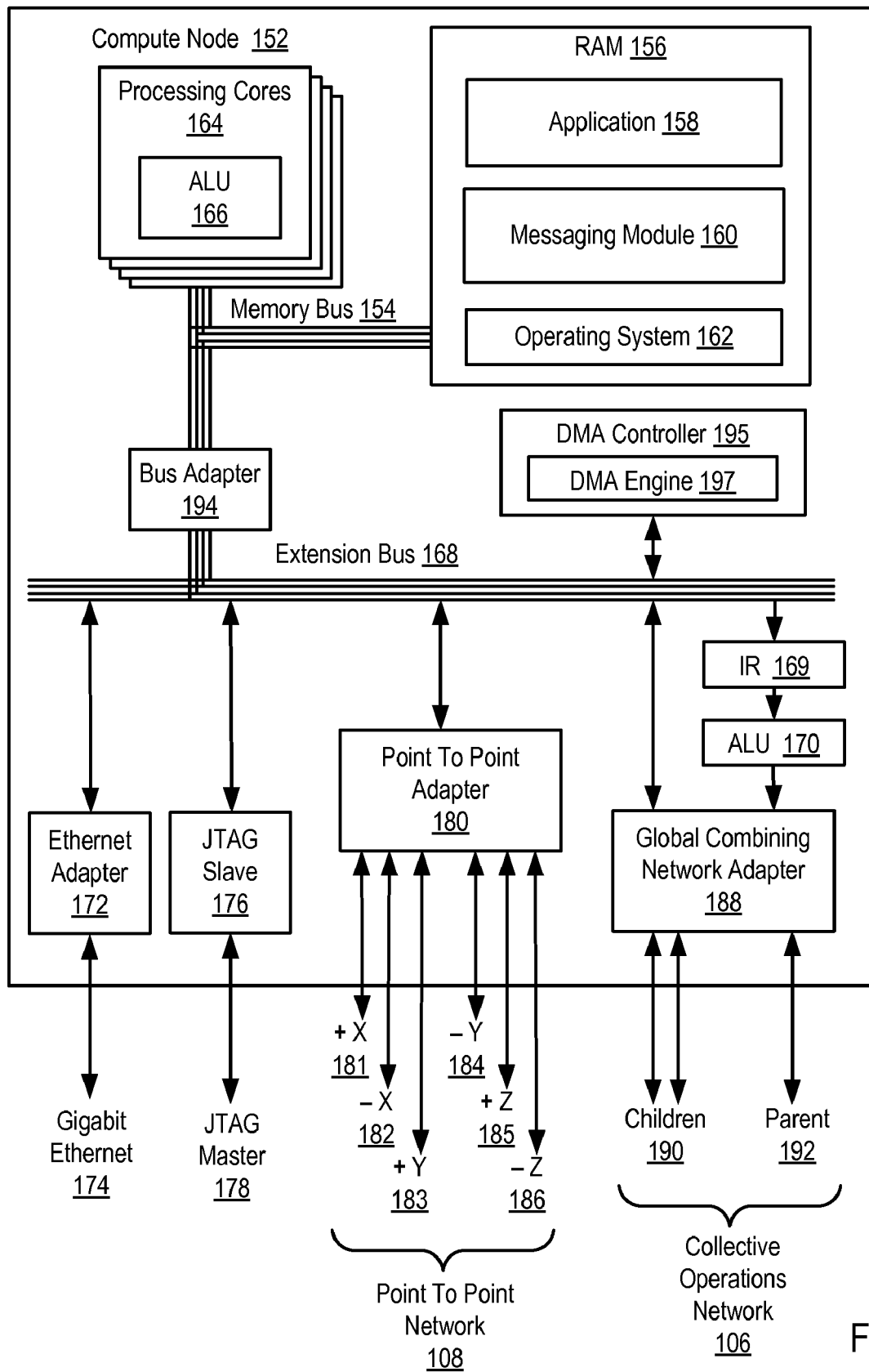
FIG. 2 sets forth a block diagram of an exemplary compute node useful in a parallel computer capable of line-plane broadcasting in a data communications network of the parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for line-plane broadcasting in a data communications network of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in line-plane broadcasting in a data communications network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), -x (182), +y (183), -y (184), +z (185), and -z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the exemplary compute node (152) of FIG. 2 is useful in a parallel computer capable of line-plane broadcasting in a data communications network of the parallel computer according to embodiments of the present invention. Such a parallel computer includes a plurality of compute nodes connected together through the data communications network optimized for point to point data communications. The data communications network is characterized by at least a first dimension, a second dimension, and a third dimension. The parallel computer in such an embodiment operates generally for line-plane broadcasting in a data communications network of the parallel computer according to embodiments of the present invention by: initiating, by a broadcasting compute node, a broadcast operation, including sending a message to all of the compute nodes along an axis of the first dimension for the data communications network; sending, by each compute node along the axis of the first dimension, the message to all of the compute nodes along an axis of the second dimension for the data communications network; and sending, by each compute node along the axis of the second dimension, the message to all of the compute nodes along an axis of the third dimension for the data communications network.

Figure 3A:
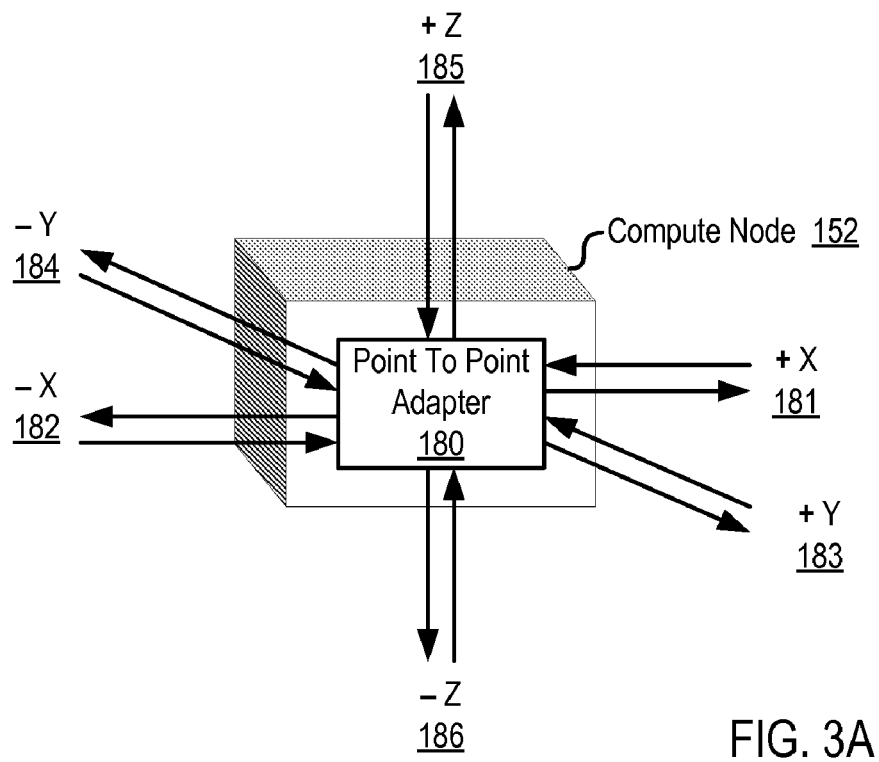
FIG. 3A illustrates an exemplary Point To Point Adapter useful in a parallel computer capable of line-plane broadcasting in a data communications network of the parallel computer according to embodiments of the present invention.

For further explanation, FIG. 3A illustrates an exemplary Point To Point Adapter (180) useful in a parallel computer capable of line-plane broadcasting in a data communications network of the parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the -x direction (182) and to and from the next node in the +x direction (181). Point To Point Adapter (180) also provides data communication along a y-axis through four unidirectional data communications links, to and from the next node in the -y direction (184) and to and from the next node in the +y direction (183). Point To Point Adapter (180) in FIG. 3A also provides data communication along a z-axis through four unidirectional data communications links, to and from the next node in the -z direction (186) and to and from the next node in the +z direction (185).

Figure 3B:
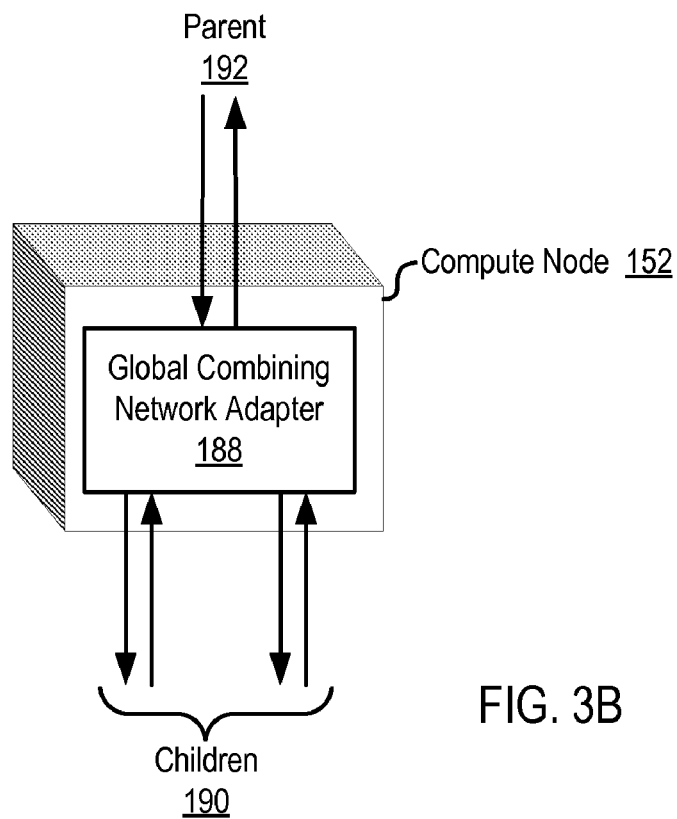
FIG. 3B illustrates an exemplary Global Combining Network Adapter useful in a parallel computer capable of line-plane broadcasting in a data communications network of the parallel computer according to embodiments of the present invention.

For further explanation, FIG. 3B illustrates an exemplary Global Combining Network Adapter (188) useful in a parallel computer capable of line-plane broadcasting in a data communications network of the parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
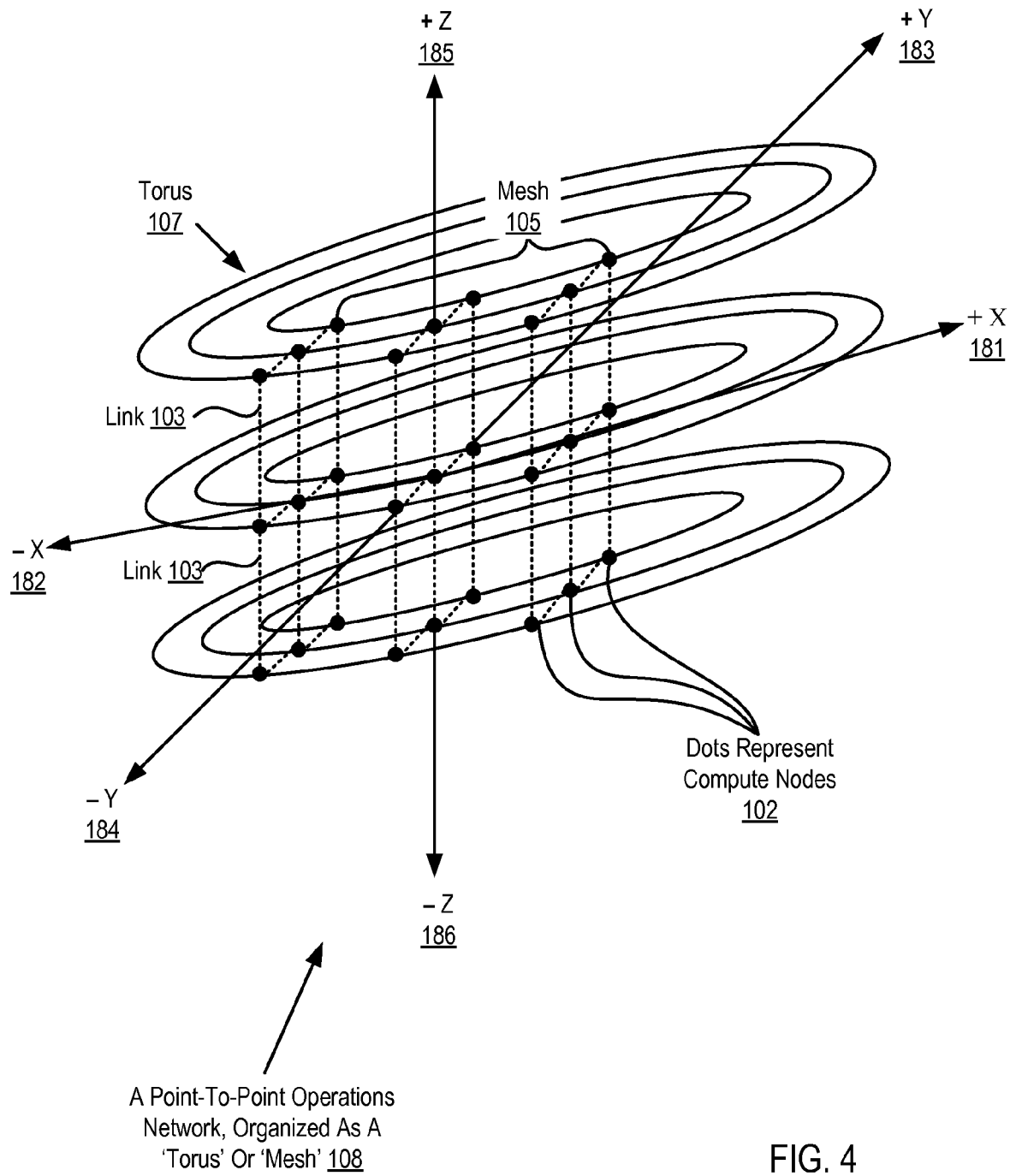
FIG. 4 sets forth a line drawing illustrating an exemplary data communications network optimized for point to point operations useful in a parallel computer capable of line-plane broadcasting in a data communications network of the parallel computer according to embodiments of the present invention.

For further explanation, FIG. 4 sets forth a line drawing illustrating an exemplary data communications network (108) optimized for point to point operations useful in a parallel computer capable of line-plane broadcasting in a data communications network of the parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), -x (182), +y (183), -y (184), +z (185), and -z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in line-plane broadcasting in a data communications network of a parallel computer in accordance with embodiments of the present invention may contain only a few compute nodes or may contain thousands of compute nodes.

Figure 5:
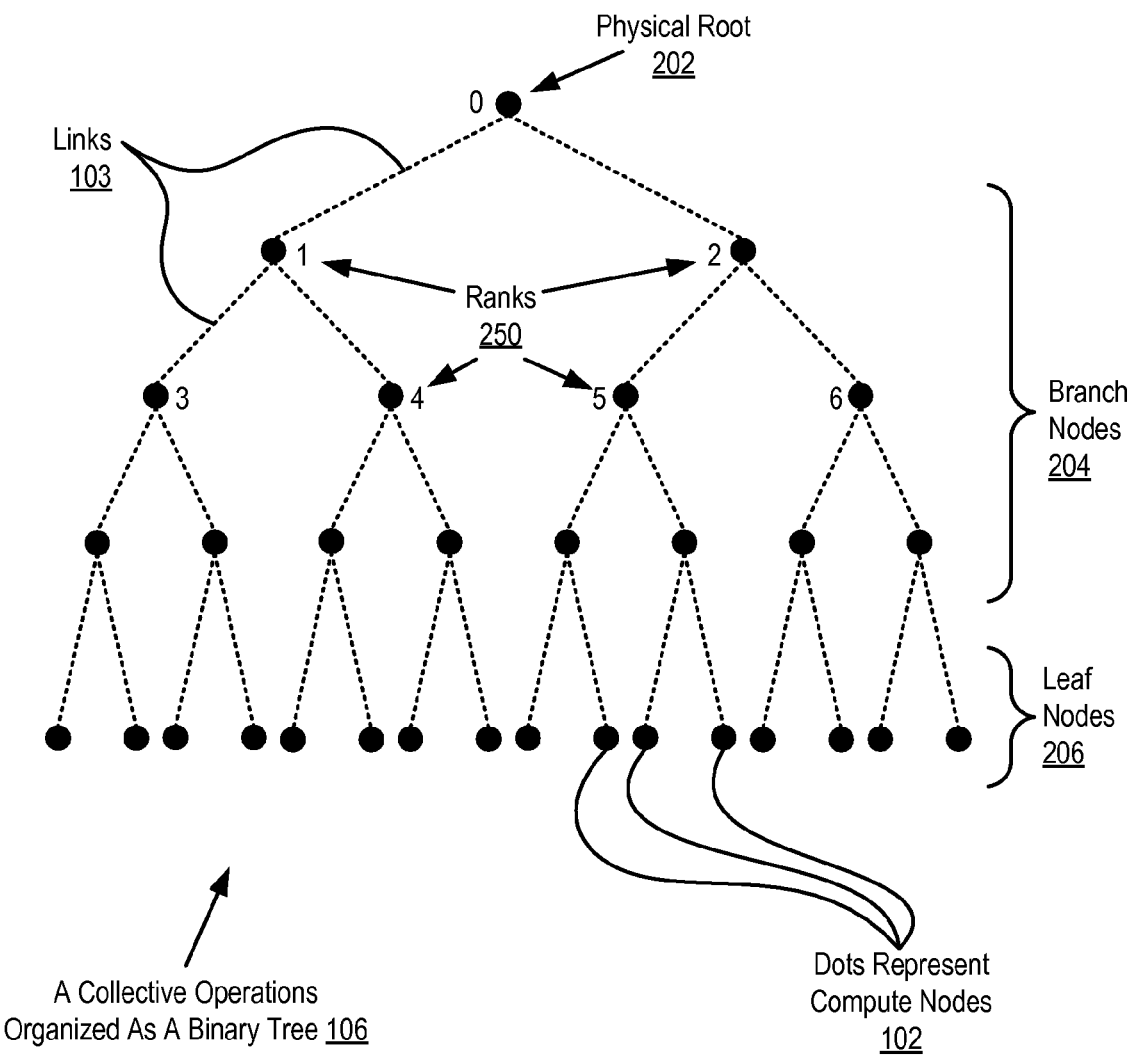
FIG. 5 sets forth a line drawing illustrating an exemplary data communications network optimized for collective operations useful in a parallel computer capable of line-plane broadcasting in a data communications network of the parallel computer according to embodiments of the present invention.

For further explanation, FIG. 5 sets forth a line drawing illustrating an exemplary data communications network (106) optimized for collective operations useful in a parallel computer capable of line-plane broadcasting in a data communications network of the parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for line-plane broadcasting in a data communications network of the parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
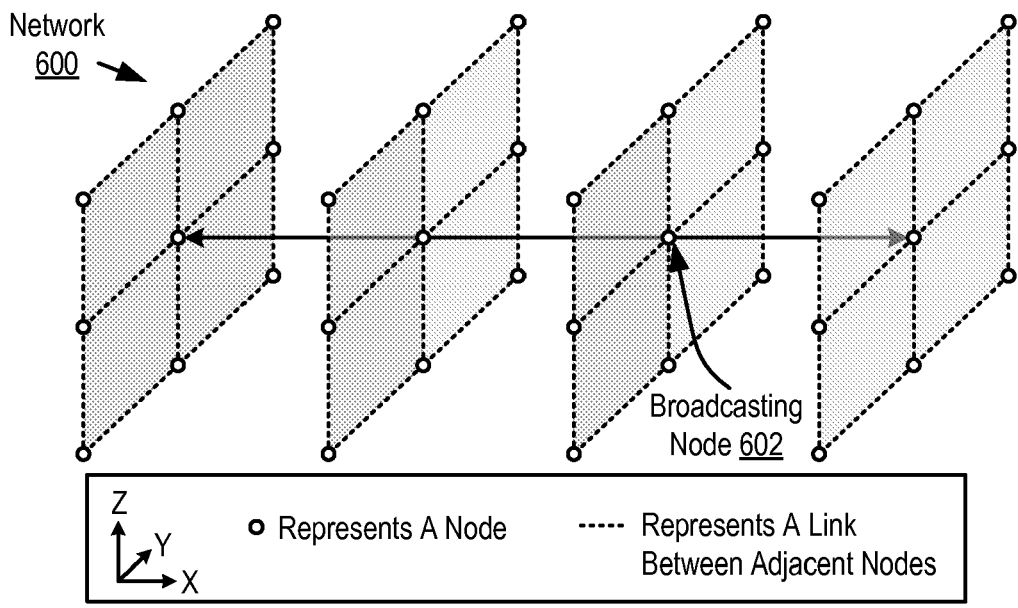
FIG. 6A sets forth a line drawing illustrating an exemplary data communications network useful in line-plane broadcasting in a data communications network of a parallel computer according to embodiments of the present invention.
Figure 6B:
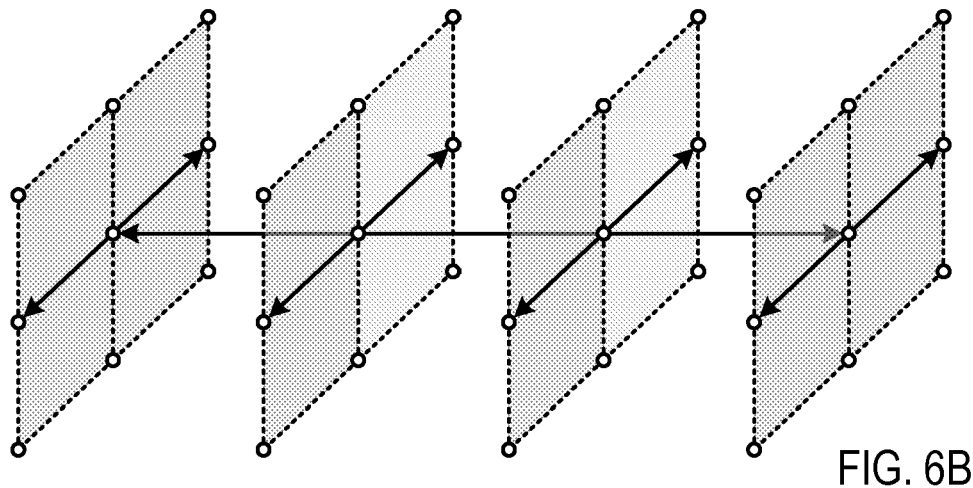
FIG. 6B sets forth a line drawing illustrating a further exemplary data communications network useful in line-plane broadcasting in a data communications network of a parallel computer according to embodiments of the present invention.
Figure 6C:
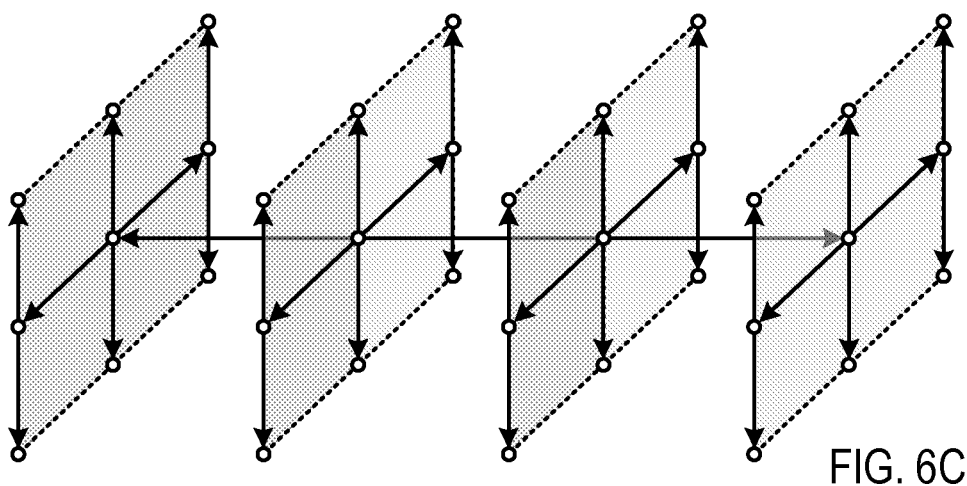
FIG. 6C sets forth a line drawing illustrating a further exemplary data communications network useful in line-plane broadcasting in a data communications network of a parallel computer according to embodiments of the present invention.

For further explanation, FIGS. 6A-C set forth line drawings illustrating exemplary data communications networks useful in line-plane broadcasting in a data communications network of a parallel computer according to embodiments of the present invention. The data communications network (600) of FIGS. 6A-C connected a plurality of compute nodes together for data communications. Taken together FIGS. 6A-C illustrate a line-plane broadcast in a data communications network of a parallel computer according to embodiments of the present invention.

The network (600) of FIGS. 6A-C is organized in a rectangular mesh topology and is optimized for point to point data communications. The network (600) is characterized by a first dimension, a second dimension, and a third dimension. The first dimension is represented as the X-dimension, the second dimension is represented as the Y-dimension, and the third dimension is represented as the Z-dimension. The axis of each dimension is perpendicular to the axis of the other dimensions. In the examples of FIGS. 6A-C, the compute nodes are connected in the network (600) using bi-directional data communications links. FIGS. 6A-C represent these links in the Y-dimension and the Z-dimension using dotted lines. Readers will note that the links along the X-dimension are omitted for clarity.

FIG. 6A illustrates a broadcasting compute node (602) initiating a broadcast operation by sending a message to all of the compute nodes along an axis of the first dimension for the data communications network (600). That is, the broadcasting compute node (602) sends a message to all of the compute nodes along an axis of the X-dimension. The broadcasting compute node (602) of FIG. 6A may send the message to all of the compute nodes along an axis of the first dimension by transmitting the network packets that encapsulate the message along an axis in both the positive and negative directions in the X-dimension with the deposit bit set. Setting the deposit bit in each network packet instructs the router for each compute node along the X-axis to store a copy of the network packet in its reception stacks and forward the network packet to the next node along the X-axis.

FIG. 6B illustrates each compute node along the axis of the first dimension sending the message to all of the compute nodes along an axis of the second dimension for the data communications network (600). That is, each compute node along the axis of the X-dimension sends the message to all of the compute nodes along an axis of the Y-dimension. Each compute node along the axis of the X-dimension may send the message to all of the compute nodes along an axis of the Y-dimension by transmitting the network packets that encapsulate the message along an axis in both the positive and negative directions in the Y-dimension with the deposit bit set.

FIG. 6C illustrates each compute node along the axis of the second dimension sending the message to all of the compute nodes along an axis of the third dimension for the data communications network (600). That is, each compute node along the axis of the Y-dimension sends the message to all of the compute nodes along an axis of the Z-dimension. Each compute node along the axis of the Y-dimension may send the message to all of the compute nodes along an axis of the Z-dimension by transmitting the network packets that encapsulate the message along an axis in both the positive and negative directions in the Z-dimension with the deposit bit set.

Figure 7:
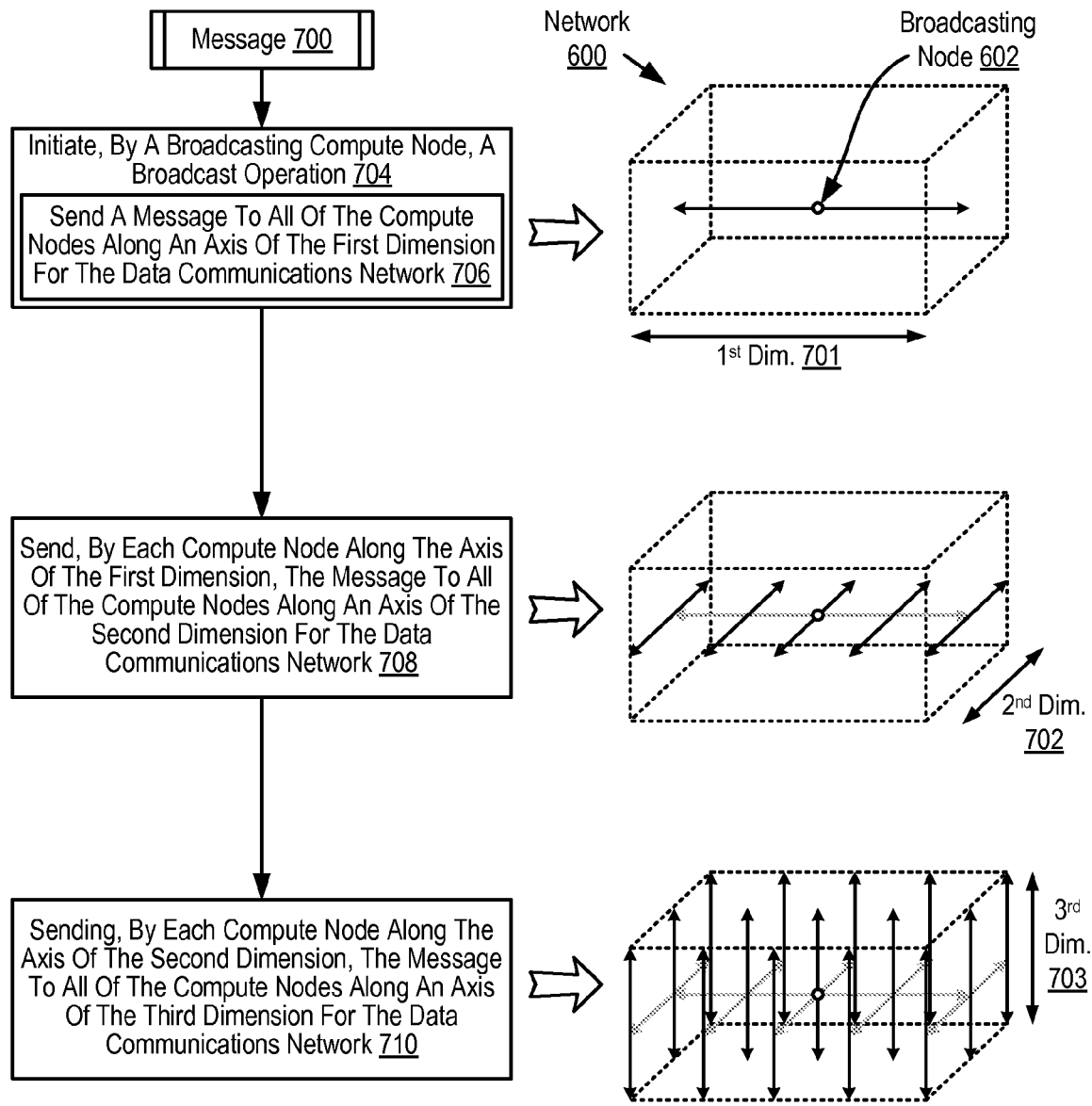
FIG. 7 sets forth a flow chart illustrating an exemplary method for line-plane broadcasting in a data communications network of a parallel computer according to embodiments of the present invention.

For further explanation, FIG. 7 sets forth a flow chart illustrating an exemplary method for line-plane broadcasting in a data communications network of a parallel computer according to embodiments of the present invention. In the example of FIG. 7, the parallel computer includes a plurality of compute nodes connected together through the data communications network (600). The data communications network (600) is optimized for point to point data communications and characterized by at least a first dimension (701), a second dimension (702), and a third dimension (703).

The method of FIG. 7 includes initiating (704), by a broadcasting compute node (602), a broadcast operation. As mentioned above, a broadcast operation is a message passing operation that distributes data from a broadcasting compute node to all of the other compute nodes in a group. In the example of FIG. 7, the data distributed by the broadcasting compute node (602) is contained in the message (700). Initiating (704), by a broadcasting compute node (602), a broadcast operation according to the method of FIG. 7 includes sending (706) a message (700) to all of the compute nodes along an axis of the first dimension (701) for the data communications network (600). Sending (706) a message (700) to all of the compute nodes along an axis of the first dimension (701) for the data communications network (600) according to the method of FIG. 7 may be carried out by encapsulating the message (700) into network packets and injecting the network packets into the data communications network (600) for transmission along the links in the first dimension (701) with the deposit bit set. As explained above, setting the deposit bit in each network packet instructs the router for each compute node along the axis of the first dimension (701) to store a copy of the network packet in its reception stacks and forward the network packet to the next node along the axis of the first dimension (701).

The method of FIG. 7 also includes sending (708), by each compute node along the axis of the first dimension (701), the message (700) to all of the compute nodes along an axis of the second dimension (702) for the data communications network (600). Sending (708), by each compute node along the axis of the first dimension (701), the message (700) to all of the compute nodes along an axis of the second dimension (702) according to the method of FIG. 7 may be carried out by receiving network packets that encapsulate the message (700) from the broadcasting node (602) along links in the first dimension (701) and injecting the network packets into the data communications network (600) for transmission along the links in the second dimension (702) with the deposit bit set.

The method of FIG. 7 includes sending (710), by each compute node along the axis of the second dimension (702), the message (700) to all of the compute nodes along an axis of the third dimension (703) for the data communications network (600). Sending (710), by each compute node along the axis of the second dimension (702), the message (700) to all of the compute nodes along an axis of the third dimension (703) according to the method of FIG. 7 may be carried out by receiving network packets that encapsulate the message (700) along the links in the second dimension (702) and injecting the network packets into the data communications network (600) for transmission along the links in the third dimension (703) with the deposit bit set.

Figure 8:
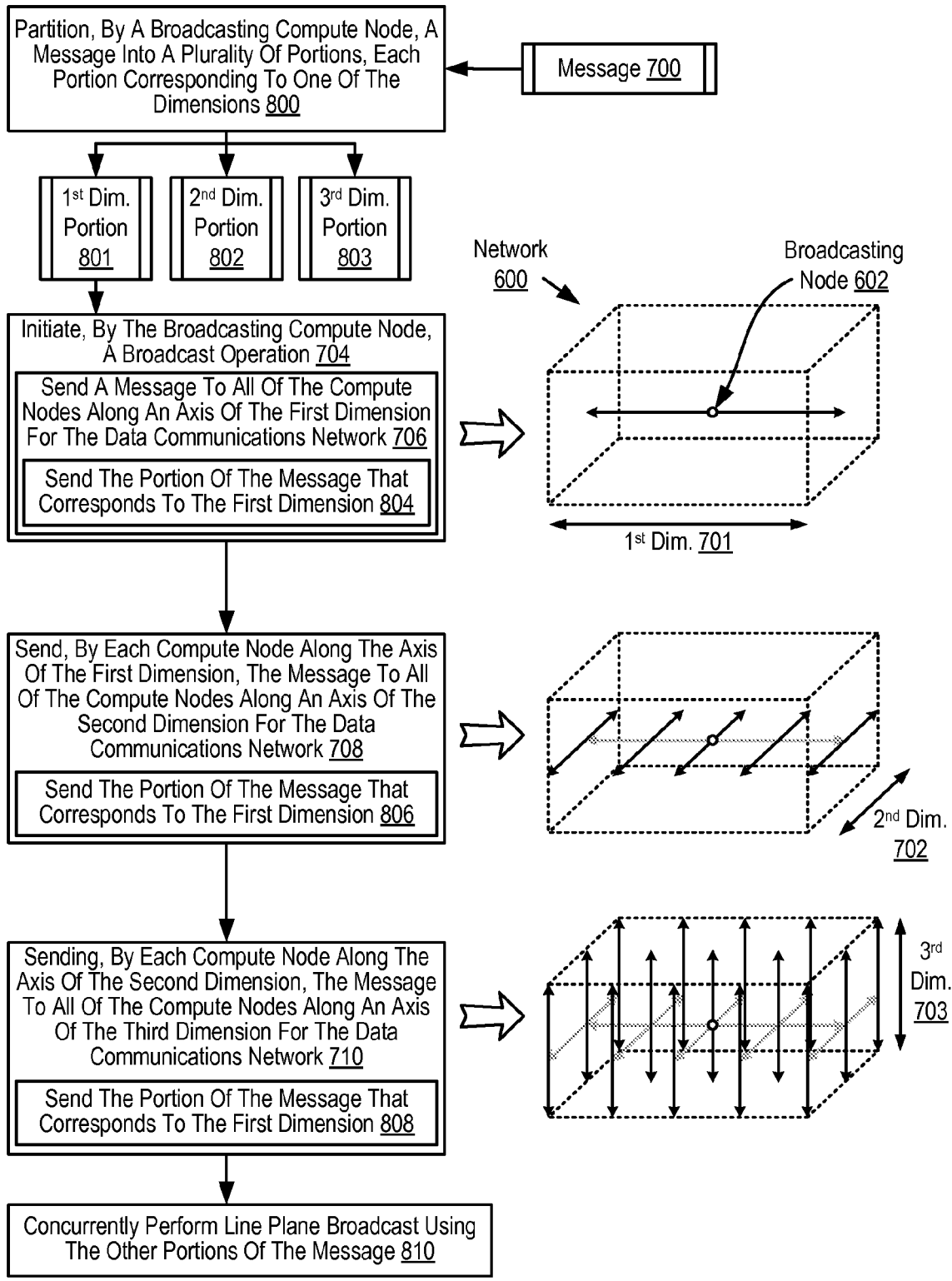
FIG. 8 sets forth a flow chart illustrating a further exemplary method for line-plane broadcasting in a data communications network of a parallel computer according to embodiments of the present invention.

The explanation above with reference to FIG. 7 describes line-plane broadcasting such that the entire message is sent by the broadcasting compute node along an axis for one of the dimensions of the data communications network. In other embodiments, however, the broadcasting compute node may send different portions of the message along axis for different dimensions. Each portion then propagates through the data communications network in a manner similar to the manner described above with reference to FIGS. 6 and 7. For further explanation, therefore, FIG. 8 sets forth a flow chart illustrating a further exemplary method for line-plane broadcasting in a data communications network of a parallel computer according to embodiments of the present invention. In the example of FIG. 8, the parallel computer includes a plurality of compute nodes connected together through the data communications network (600). The data communications network (600) is optimized for point to point data communications and characterized by at least a first dimension (701), a second dimension (702), and a third dimension (703).

The method of FIG. 8 is similar to the method of FIG. 7. That is, the method of FIG. 8 includes: initiating (704), by a broadcasting compute node (602), a broadcast operation, including sending (706) a message (700) to all of the compute nodes along an axis of the first dimension (701) for the data communications network (600); sending (708), by each compute node along the axis of the first dimension (701), the message (700) to all of the compute nodes along an axis of the second dimension (702) for the data communications network (600); and sending (710), by each compute node along the axis of the second dimension (702), the message (700) to all of the compute nodes along an axis of the third dimension (703) for the data communications network (600).

The method of FIG. 8 differs from the method of FIG. 7, however, in that FIG. 8 includes partitioning (800), by the broadcasting compute node (602), the message (700) into a plurality of portions (801, 802, 803), each portion (801, 802, 803) corresponding to one of the dimensions (701, 702, 703). Partitioning (800), by the broadcasting compute node (602), the message (700) into a plurality of portions (801, 802, 803) according to the method of FIG. 7 may be carried out by dividing the message (700) into a number of equal-size segments that matches the number of dimensions in the network (600). In the example of FIG. 8, the message (700) is partitioned in to three portions (801, 802, 803). The message portion (801) corresponds to the first dimension (701). The message portion (802) corresponds to the second dimension (702). The message portion (803) corresponds to the third dimension (703). Although the message (700) of FIG. 8 is divided into a number of equal-sized segments that match the number of dimensions for the network (600), readers will note that in some embodiments the message (700) may be partitioned into a number of unequal-sized segments that do not match the number of dimensions for the network (600).

In the example of FIG. 8, sending (706) a message (700) to all of the compute nodes along an axis of the first dimension (701) includes sending (804) the portion (801) of the message (700) that corresponds to the first dimension (701) to all of the compute nodes along the axis of the first dimension (701) for the data communications network (600). Sending (804) the portion (801) of the message (700) that corresponds to the first dimension (701) to all of the compute nodes along the axis of the first dimension (701) according to the method of FIG. 8 may be carried out by encapsulating the first dimension message portion (801) into network packets and injecting the network packets into the data communications network (600) for transmission along the links in the first dimension (701) with the deposit bit set.

In the example of FIG. 8, sending (708), by each compute node along the axis of the first dimension (701), the message (700) to all of the compute nodes along an axis of the second dimension (702) includes sending (806), by each compute node along the axis of the first dimension (701), the portion (801) of the message (700) that corresponds to the first dimension (701) to all of the compute nodes along the axis of the second dimension (702) for the data communications network (600). Sending (806), by each compute node along the axis of the first dimension (701), the portion (801) of the message (700) that corresponds to the first dimension (701) to all of the compute nodes along the axis of the second dimension (702) according to the method of FIG. 8 may be carried out by receiving network packets that encapsulate the first dimension message portion (801) from the broadcasting node (602) along links in the first dimension (701) and injecting the network packets into the data communications network (600) for transmission along the links in the second dimension (702) with the deposit bit set.

In the example of FIG. 8, sending (710), by each compute node along the axis of the second dimension (702), the message (700) to all of the compute nodes along an axis of the third dimension (703) includes sending (808), by each compute node along the axis of the second dimension (702), the portion (801) of the message (700) that corresponds to the first dimension (701) to all of the compute nodes along the axis of the third dimension (703) for the data communications network (600). Sending (808), by each compute node along the axis of the second dimension (702), the portion (801) of the message (700) that corresponds to the first dimension (701) to all of the compute nodes along the axis of the third dimension (703) according to the method of FIG. 8 may be carried out by receiving network packets that encapsulate the first dimension message portion (801) along the links in the second dimension (702) and injecting the network packets into the data communications network (600) for transmission along the links in the third dimension (703) with the deposit bit set.

The method of FIG. 8 also includes concurrently performing (810) a line plane broadcast using the other portions (802, 803) of the message (700). Concurrently performing (810) the line plane broadcast using the other portions (802, 803) of the message (700) according to the method of FIG. 8 may operate in a manner similar to the manner described above using the first dimension message portion (801). In performing (810) the line plane broadcast using the other portions (802, 803) of the message (700) according to the method of FIG. 8, however, the second dimension message portion (802) may initially propagate along the second dimension (702), then along the first dimension (701), and finally along the third dimension (703). Similarly, the third second dimension message portion (803) may initially propagate along the third dimension (703), then along the first dimension (701), and finally along the second dimension (703).

Figure 9:
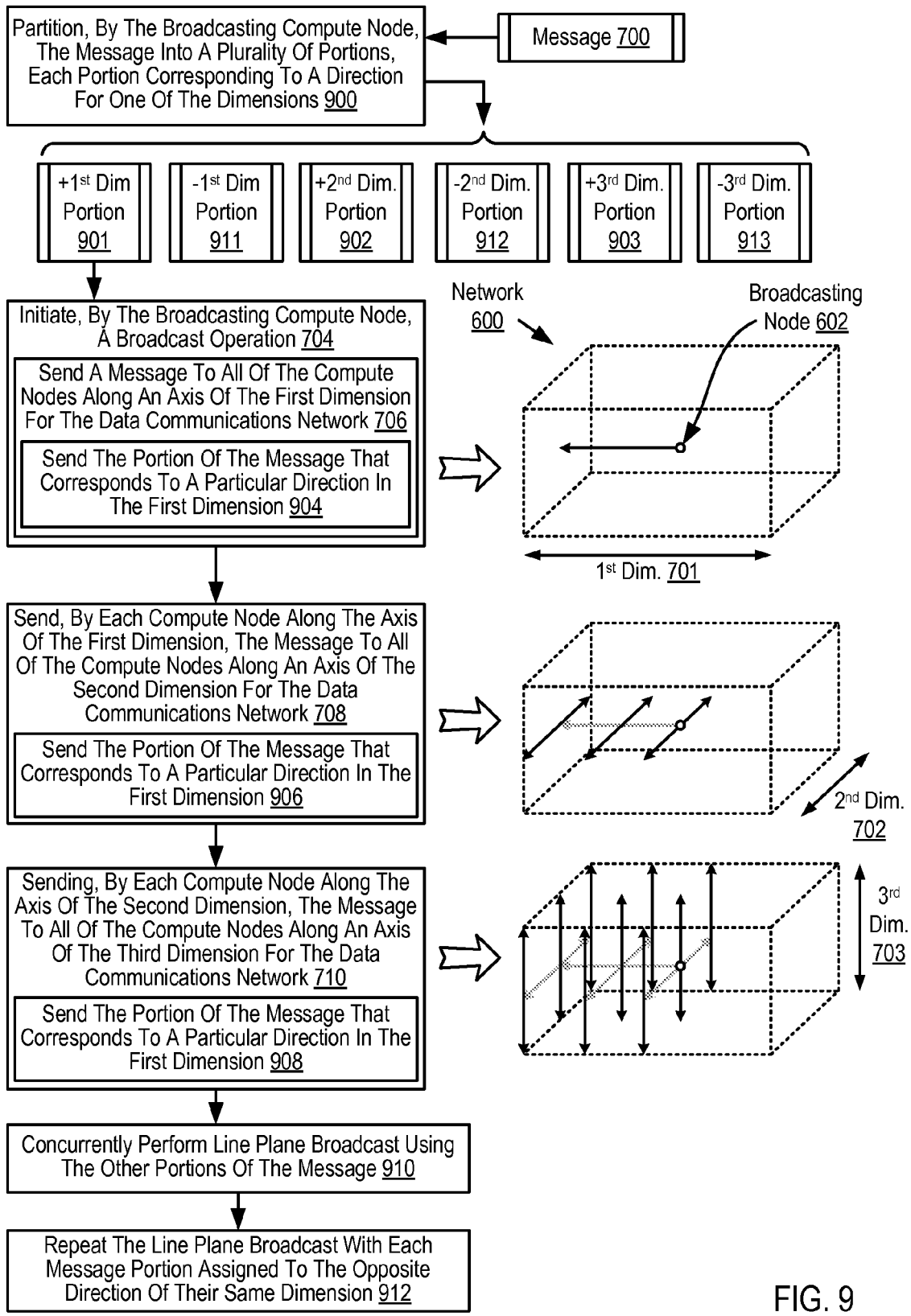
FIG. 9 sets forth a flow chart illustrating a further exemplary method for line-plane broadcasting in a data communications network of a parallel computer according to embodiments of the present invention.

In FIG. 8, the message is partitioned into a plurality of portions that each correspond to one of the dimensions of the network. In other embodiments, however, the message may be partitioned into a plurality of portions that each correspond to a direction for one of the dimensions of the network. For further explanation, FIG. 9 sets forth a flow chart illustrating a further exemplary method for line-plane broadcasting in a data communications network of a parallel computer according to embodiments of the present invention. In the example of FIG. 9, the parallel computer includes a plurality of compute nodes connected together through the data communications network (600). The data communications network (600) is optimized for point to point data communications and characterized by at least a first dimension (701), a second dimension (702), and a third dimension (703).

The method of FIG. 9 is similar to the method of FIG. 7. That is, the method of FIG. 9 includes: initiating (704), by a broadcasting compute node (602), a broadcast operation, including sending (706) a message (700) to all of the compute nodes along an axis of the first dimension (701) for the data communications network (600); sending (708), by each compute node along the axis of the first dimension (701), the message (700) to all of the compute nodes along an axis of the second dimension (702) for the data communications network (600); and sending (710), by each compute node along the axis of the second dimension (702), the message (700) to all of the compute nodes along an axis of the third dimension (703) for the data communications network (600).

The method of FIG. 9 differs from the method of FIG. 7 in that the method of FIG. 9 includes partitioning (900), by the broadcasting compute node (602), the message (700) into a plurality of portions (901, 911, 902, 912, 903, 913), each portion (901, 911, 902, 912, 903, 913) corresponding to a direction for one of the dimensions (701, 702, 703). Partitioning (900), by the broadcasting compute node (602), the message (700) into a plurality of portions (901, 911, 902, 912, 903, 913) according to the method of FIG. 9 may be carried out by dividing the message (700) into a number of equal-size segments that matches twice the number of dimensions in the network (600). In the example of FIG. 9, the message (700) is partitioned in to six portions (901, 911, 902, 912, 903, 913). The message portion (901) corresponds to the positive direction of the first dimension (701). The message portion (911) corresponds to the negative direction of the first dimension (701). The message portion (902) corresponds to the positive direction of the second dimension (702). The message portion (912) corresponds to the negative direction of the second dimension (702). The message portion (903) corresponds to the positive direction of the third dimension (703). The message portion (913) corresponds to the negative direction of the third dimension (703). Although the message (700) of FIG. 9 is divided into a number of equal-sized segments that match twice number of dimensions for the network (600), readers will note that in some embodiments the message (700) may be partitioned into a number of unequal-sized segments that do not match twice number of dimensions for the network (600).

In the method of FIG. 9, sending (706) a message (700) to all of the compute nodes along an axis of the first dimension (701) includes sending (904) the portion (901) of the message (700) that corresponds a particular direction in the first dimension (701) to all of the compute nodes in the particular direction along the axis of the first dimension (701) for the data communications network (600). Sending (904) the portion (901) of the message (700) that corresponds a particular direction in the first dimension (701) to all of the compute nodes in the particular direction along the axis of the first dimension (701) according to the method of FIG. 9 may be carried out by encapsulating the positive direction first dimension message portion (901) into network packets and injecting the network packets into the data communications network (600) for transmission along the links in the positive direction for the first dimension (701) with the deposit bit set.

In the method of FIG. 9, sending (708), by each compute node along the axis of the first dimension (701), the message (700) to all of the compute nodes along an axis of the second dimension (702) includes sending (906), by each compute node in the particular direction along the axis of the first dimension (701), the portion of the message (700) that corresponds to the particular direction in the first dimension (701) to all of the compute nodes along the axis of the second dimension (702) for the data communications network (600). Sending (906), by each compute node in the particular direction along the axis of the first dimension (701), the portion of the message (700) that corresponds to the particular direction in the first dimension (701) to all of the compute nodes along the axis of the second dimension (702) according to the method of FIG. 9 may be carried out by receiving network packets that encapsulate the positive direction first dimension message portion (901) from the broadcasting node (602) along links in the first dimension (701) and injecting the network packets into the data communications network (600) for transmission along the links in the second dimension (702) with the deposit bit set.

In the method of FIG. 9, sending (710), by each compute node along the axis of the second dimension (702), the message (700) to all of the compute nodes along an axis of the third dimension (703) includes sending (908), by each compute node along the axis of the second dimension (702), the portion of the message (700) that corresponds to the particular direction in the first dimension (701) to all of the compute nodes along the axis of the third dimension (703) for the data communications network (600). Sending (908), by each compute node along the axis of the second dimension (702), the portion of the message (700) that corresponds to the particular direction in the first dimension (701) to all of the compute nodes along the axis of the third dimension (703) according to the method of FIG. 9 may be carried out by receiving network packets that encapsulate the positive direction first dimension message portion (901) along the links in the second dimension (702) and injecting the network packets into the data communications network (600) for transmission along the links in the third dimension (703) with the deposit bit set.

The method of FIG. 9 also includes concurrently performing (910) a line plane broadcast using the other portions (911, 902, 912, 903, 913) of the message (700). Concurrently performing (910) a line plane broadcast using the other portions (911, 902, 912, 903, 913) of the message (700) according to the method of FIG. 9 may operate in a manner similar to the manner described above using the positive direction first dimension message portion (901). In performing (910) the line plane broadcast using the other portions (911, 902, 912, 903, 913) of the message (700) according to the method of FIG. 9, however, the negative direction first dimension message portion (911) may initially propagate in negative direction along the first dimension (701), then along the second dimension (702), and finally along the third dimension (703). Similarly, the positive direction second dimension message portion (902) may initially propagate in positive direction along the second dimension (702), then along the first dimension (701), and finally along the third dimension (703). The negative direction second dimension message portion (912) may initially propagate in negative direction along the second dimension (702), then along the first dimension (701), and finally along the third dimension (703). The positive direction third dimension message portion (903) may initially propagate in positive direction along the third dimension (703), then along the first dimension (701), and finally along the second dimension (702). The negative direction third dimension message portion (913) may initially propagate in negative direction along the third dimension (703), then along the first dimension (701), and finally along the second dimension (702).

The method of FIG. 9 also includes repeating (912) the line plane broadcast with each message portion (901, 911, 902, 912, 903, 913) assigned to the opposite direction of their same dimension. That is, the message portion (901) that corresponds with the positive direction of the first dimension (701) is now assigned to the negative direction of the first dimension (701) and the line plane broadcast is repeated with the message portion (901) being sent from the broadcasting node (602) along the negative direction of the first dimension (701). Similarly, the message portion (911) that corresponds with the negative direction of the first dimension (701) is now assigned to the positive direction of the first dimension (701) and the line plane broadcast is repeated with the message portion (911) being sent from the broadcasting node (602) along the positive direction of the first dimension (701). The message portion (902) that corresponds with the positive direction of the second dimension (702) is now assigned to the negative direction of the second dimension (702) and the line plane broadcast is repeated with the message portion (902) being sent from the broadcasting node (602) along the negative direction of the second dimension (702). The message portion (912) that corresponds with the negative direction of the second dimension (701) is now assigned to the positive direction of the second dimension (702) and the line plane broadcast is repeated with the message portion (912) being sent from the broadcasting node (602) along the positive direction of the second dimension (702). The message portion (903) that corresponds with the positive direction of the third dimension (703) is now assigned to the negative direction of the third dimension (703) and the line plane broadcast is repeated with the message portion (903) being sent from the broadcasting node (602) along the negative direction of the third dimension (703). The message portion (913) that corresponds with the negative direction of the third dimension (703) is now assigned to the positive direction of the third dimension (703) and the line plane broadcast is repeated with the message portion (913) being sent from the broadcasting node (602) along the positive direction of the third dimension (703). In such a manner all of the nodes in the network (600) have all of the portions (901, 911, 902, 912, 903, 913) of the message (700).

Exemplary embodiments of the present invention are described largely in the context of a fully functional parallel computer system for line-plane broadcasting in a data communications network of a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for line-plane broadcasting in a data communications network of a parallel computer, the parallel computer comprising a plurality of compute nodes connected together through the data communications network, the data communications network optimized for point to point data communications and characterized by at least a first dimension, a second dimension, and a third dimension, the method further comprising:

initiating, by a broadcasting compute node, a broadcast operation, including sending a message to all of the compute nodes along an axis of the first dimension for the data communications network;

sending, by each compute node along the axis of the first dimension, the message to all of the compute nodes along an axis of the second dimension for the data communications network;

sending, by each compute node along the axis of the second dimension, the message to all of the compute nodes along an axis of the third dimension for the data communications network;

partitioning, by the broadcasting compute node, the message into a plurality of portions, each portion corresponding to one of the dimensions;

sending a message to all of the compute nodes along an axis of the first dimension for the data communications network further comprises sending the portion of the message that corresponds to the first dimension to all of the compute nodes along the axis of the first dimension for the data communications network;

sending, by each compute node along the axis of the first dimension, the message to all of the compute nodes along an axis of the second dimension for the data communications network further comprises sending, by each compute node along the axis of the first dimension, the portion of the message that corresponds to the first dimension to all of the compute nodes along the axis of the second dimension for the data communications network; and sending, by each compute node along the axis of the second dimension, the message to all of the compute nodes along an axis of the third dimension for the data communications network further comprises sending, by each compute node along the axis of the second dimension, the portion of the message that corresponds to the first dimension to all of the compute nodes along the axis of the third dimension for the data communications network.

2. The method of claim 1 wherein:
the data communications network is organized in a rectangular mesh topology and is characterized by the first dimension, the second dimension, and the third dimension; and
the axis of each dimension is perpendicular to the axis of the other dimensions.

3. The method of claim 1 wherein the plurality of compute nodes are organized into at least one operational group and wherein the line plane broadcasting in the data communications network is carried out using only the compute nodes in the operational group.

4. The method of claim 1 wherein the plurality of compute nodes are also connected together for data communications through another data communications network optimized for collective operations.

5. A method for line-plane broadcasting in a data communications network of a parallel computer, the parallel computer comprising a plurality of compute nodes connected together through the data communications network and through another data communications network, the data communications network optimized for point to point data communications, the another data communications network optimized for collective operations, the data communications network organized in a rectangular mesh topology and characterized by a first dimension, a second dimension, and a third dimension, the method further comprising:

partitioning, by a broadcasting compute node, a message into a plurality of portions, each portion corresponding to one of the dimensions;

initiating, by the broadcasting compute node, a broadcast operation, including sending the portion of the message that corresponds to the first dimension to all of the compute nodes along an axis of the first dimension for the data communications network;

sending, by each compute node along the axis of the first dimension, the portion of the message that corresponds to the first dimension to all of the compute nodes along an axis of the second dimension for the data communications network; and sending, by each compute node along the axis of the second dimension, the portion of the message that corresponds to the first dimension to all of the compute nodes along an axis of the third dimension for the data communications network, wherein the plurality of compute nodes are organized into at least one operational group and wherein the line plane broadcasting in the data communications network is carried out using only the compute nodes in the operational group.

6. A method for line-plane broadcasting in a data communications network of a parallel computer, the parallel computer comprising a plurality of compute nodes connected together through the data communications network, the data communications network optimized for point to point data communications and characterized by at least a first dimension, a second dimension, and a third dimension, the method further comprising:

initiating, by a broadcasting compute node, a broadcast operation, including sending a message to all of the compute nodes along an axis of the first dimension for the data communications network;

sending, by each compute node along the axis of the first dimension, the message to all of the compute nodes along an axis of the second dimension for the data communications network;

sending, by each compute node along the axis of the second dimension, the message to all of the compute nodes along an axis of the third dimension for the data communications network;

partitioning, by the broadcasting compute node, the message into a plurality of portions, each portion corresponding to a direction for one of the dimensions;

sending a message to all of the compute nodes along an axis of the first dimension for the data communications network further comprises sending the portion of the message that corresponds a particular direction in the first dimension to all of the compute nodes in the particular direction along the axis of the first dimension for the data communications network;

sending, by each compute node along the axis of the first dimension, the message to all of the compute nodes along an axis of the second dimension for the data communications network further comprises sending, by each compute node in the particular direction along the axis of the first dimension, the portion of the message that corresponds to the particular direction in the first dimension to all of the compute nodes along the axis of the second dimension for the data communications network; and sending, by each compute node along the axis of the second dimension, the message to all of the compute nodes along an axis of the third dimension for the data communications network further comprises sending, by each compute node along the axis of the second dimension, the portion of the message that corresponds to the particular direction in the first dimension to all of the compute nodes along the axis of the third dimension for the data communications network.

7. The method of claim 6 wherein:
the data communications network is organized in a rectangular mesh topology and is characterized by the first dimension, the second dimension, and the third dimension; and
the axis of each dimension is perpendicular to the axis of the other dimensions.

8. The method of claim 6 wherein the plurality of compute nodes are organized into at least one operational group and wherein the line plane broadcasting in the data communications network is carried out using only the compute nodes in the operational group.

9. The method of claim 6 wherein the plurality of compute nodes are also connected together for data communications through another data communications network optimized for collective operations.

* * * * *